United States Patent Office 3,210,852
Patented Oct. 12, 1965

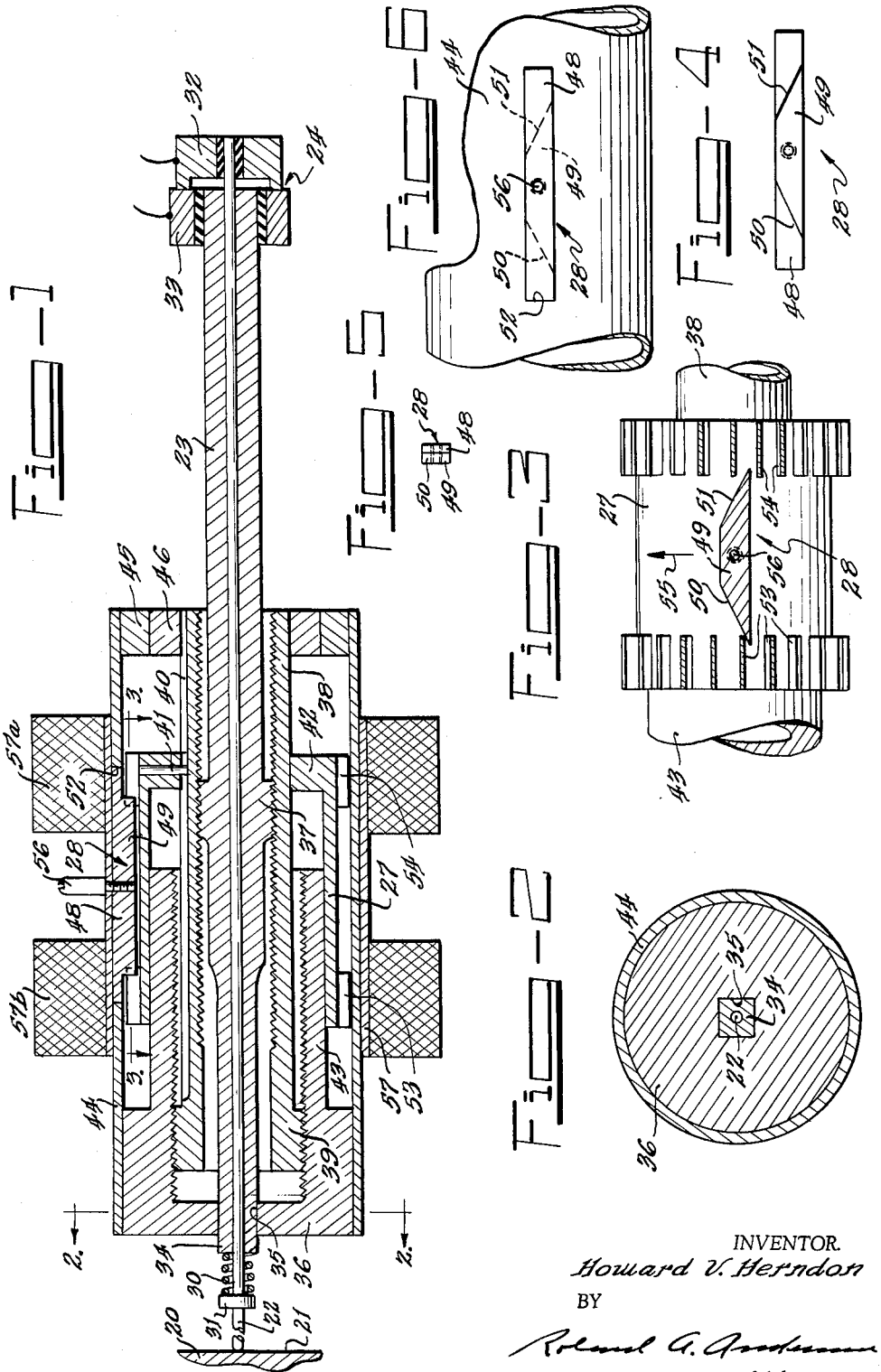

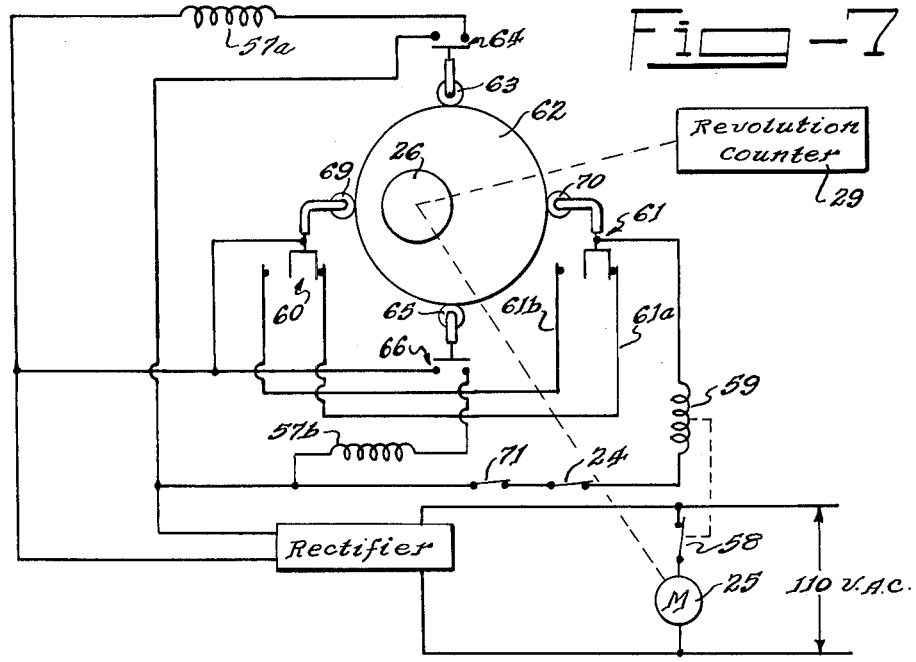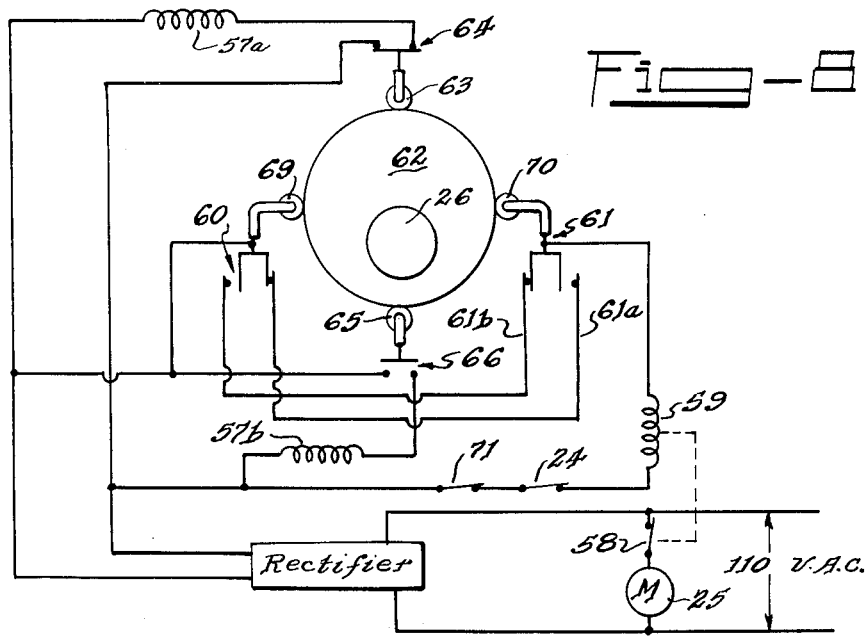

3,210,852
UNILINEAR DISPLACEMENT MEASURING
APPARATUS
Howard V. Herndon, Richland, Wash., assignor to the United States of America as represented by the United States Atomic Energy Commission
Filed Apr. 8, 1964, Ser. No. 358,386
8 Claims. (Cl. 33—125)

The present invention relates to an apparatus for measuring very small displacements. More specifically, it relates to an apparatus that measures a small displacement due to dimensional changes of an object by producing a corresponding displacement of its own.

When an object changes in size with temperature or creep of metallic structure with the elapse of time, the magnitude of such a change is likely to be very small.

The apparatus of the present invention measures a small displacement by having one of its own elements reproduce such displacement, bringing this about by a very large number of movements of another of its elements, and counting such movements. More particularly, in the apparatus of the present invention, a rotating shaft reciprocates a part, the part in reciprocating angularly shifts to rotate and move axially one of a set of threaded members, another of the set is moved axially an amount equal to the displacement to be measured, and a counter indicates the rotations of the shaft as a measure of the said displacement. Significant features of the present invention are that the reciprocating part reciprocates many times to produce a single rotation of the one threaded member and that the latter has many times the axial movement of the other threaded member.

In the drawings:

FIG. 1 is a longitudinal sectional view of the apparatus of the present invention;

FIG. 2 is a transverse sectional view taken on the line 2—2 of FIG. 1;

FIG. 3 is a fragmentary sectional view taken on the line 3—3 of FIG. 1 showing how a latch rotates a reciprocating core;

FIG. 4 is a bottom view of the latch;

FIG. 5 is an end view of the latch;

FIG. 6 is a plan view of the latch and a shell in which it fits;

FIG. 7 is a diagrammatic view showing the electrical circuit of the present apparatus; and FIG. 8 is a diagrammatic view of a portion of the electrical circuit showing a control cam of the present apparatus in a position different from that shown in FIG. 7.

The apparatus of the present invention may be used, for example, to measure the very small dimensional changes of a fixed object 20, or more particularly, the very small displacement of a surface 21 of the object to the right as viewed in FIG. 1, such displacement occurring with dimensional changes of the object.

Referring to FIGS. 1, 3, and 7, such displacement is measured essentially through a rod 22 abutting the surface 21, a threaded member 23 containing the rod, a switch 24 controlled by the rod and threaded member, a motor 25 controlled by the switch, a shaft 26 driven by the motor, a part 27 reciprocated by the shaft, a pawl 28 angularly displacing the part as it reciprocates, and a revolution counter 29 for the shaft 26. As shown in FIG. 1, displacement of the surface 21 of object 20 to the right produces corresponding displacement of the rod 22 with respect to the threaded member 23 and opening of the switch 24. As a result, the motor 25 is driven, the shaft 26 rotates, and part 27 reciprocates. The part 27, which is a solenoid core or armature, shifts angularly with each reciprocation under the action of the pawl 28, and in so doing, acts through means to be described presently to move the threaded member 23 sufficiently to the right to close the switch 24, with the result that the motor 25 is shut off and the shaft 26 stops rotating. The rotations of the shaft that have occurred until this point constitute a measure of the displacement of the surface 21 of object 20 and are indicated by the counter 29.

As shown in FIG. 1, the left end of the rod 22 is maintained in contact with the surface 21 of the object 20 by a coil spring 30 whose ends abut a collar 31 on the rod 22 and the left end of the tubular member 23. The right end of the rod 22 projects beyond the right end of the tubular member 23. Contact elements 32 and 33 of the switch 24 are mounted on, and insulated from, the right ends of the rod 22 and the threaded member 23, respectively.

The threaded member 23, which is tubular and moves axially as aforesaid to follow the rod 22, is held against rotation, as shown in FIG. 2, by virtue of sliding engagement of a square portion 34 of the threaded member 23 adjacent its left end with a square opening 35 formed in a fixed threaded member or housing 36, which is neither rotatable about the axis of the threaded member 23 nor movable along said axis. The member 23 has intermediate its ends an exterior threaded portion 37 which engages the threaded interior of a threaded member 38, which is tubular and is both rotatable about its own axis and shiftable there along. The member 38 has at its left end an exterior threaded portion 39 which engages the threaded interior of the threaded member 36.

The member 38 has an external longitudinal groove 40, which extends the length of the member 38 except at the threaded portion 39. The groove 40 receives a pin 41 which is fixed in and projects radially inwardly from a reduced portion 42 formed at the right end of the reciprocating part 27. The interior of the reduced portion 42 of the part 27 slidably engages the exterior of the tubular member 38. The interior of the part 27 except for the reduced portion 42 is slidably engageable with the exterior of a reduced portion 43 of the housing 36.

The reciprocating part 27 is enclosed in a shell 44, which has its left end fixed to the left end of the housing 36 and carries within its right end a ring 45 mounting a bearing 46 exteriorly supporting the tubular member 38 adjacent its right end.

As shown in FIGS. 4 and 5, the pawl 28 has an oblong base 48 and an operating portion 49 which is somewhat shorter than the base and is provided on one side with oblique camming surfaces 50 and 51. As shown in FIG. 6, the shell 44 has a longitudinal oblong slot 52, which receives the oblong base 48 of the pawl 28.

As shown in FIGS. 1 and 3, the operating portion 49 of the pawl lies radially inwardly of the base 48 within the shell 44 in the path of two sets of peripheral spaced longitudinally extending projections 53 and 54 provided on the exterior of the reciprocating core 27 at its ends. For each set of projections the peripheral spacing is greater than the peripheral width or thickness. The projections of each set are staggered with respect to the projections of the other set so as, if extended to the projections of the other set, to project freely therebetween. Thus, as shown in FIG. 3, the length of the operating portion 49 of the pawl 28 can be and is greater than the longitudinal spacing of the projections 53 from the projections 54, so that as the part 27 reciprocates with respect to the pawl 28, the operating portion 49 thereof always extends into the space between adjacent projections of at least one of the sets of projections 53 and 54. As shown in FIGURE 3, movement of the part 27 to the right produces angular movement thereof in the direction of arrow 55 because of engagement of one of the projections 53 with the camming surface 50. Now, upon leftward movement of the part 27, engagement of one of the projections 54 with the camming surface 51 produces further angular movement of the part 27 in the direction of the arrow 55. The camming surface 50 is ready to engage the next projection 53, since the angular movement produced by one reciprocation of the part 27 is equal to the angular spacing between adjacent projections 53 or 54.

As shown in FIGURE 1, the pawl 28 is held in position in the slot 52 in the shell 44 by a screw 56 and a sleeve 57. The sleeve is mounted on the outside of the shell 44 and carries two spaced solenoid coils 57a and 57b which are alternately energized to reciprocate the part 27. Since the coils reciprocate the part 27, it becomes evident why the part may be termed a solenoid armature or core, as has already been done. The screw 56 passes freely through the sleeve 57 and has threaded engagement with an opening in the pawl 28. The head of the screw 56 engages the sleeve 57. By virtue of the screw 56 and sleeve 57 the pawl 28 is centered with respect to the solenoid coils 57a and 57b.

As shown in FIG. 7, the motor 25 is operated by closing of a switch 58 which is closed when the relay coil 59 is not energized and open when the coil is energized. The coil 59 is energized when the switch 24 is closed and switches 60 and 61 are both connected to line 61a as shown in FIG. 7 or both connected to line 61b as occurs in a position of a cam 62 displaced 180° from that of FIG. 7. Switch 60 is normally connected with line 61a, and switch 61 is normally connected with line 61a, and switch 61 is normally connected with line 61b. When switch 24 is opened, because as previously described, rod 22 has moved rightward with respect to threaded member 23, shown in FIG. 1, because of rightward movement of surface 21 of object 20, relay 59 is no longer energized, with the result that switch 58 is closed, and motor 25 is driven. The shaft 26, being connected with motor 25, is rotated, and with the shaft, the cam 62, which is fixed to the shaft.

When the cam 62 is rotated near the position shown in FIG. 8, it causes a follower 63 to close a normally open switch 64, with the result that coil 57a is energized. This pulls core 27 to the right as viewed in FIGS. 1 and 3, and the core 27 moves angularly a small amount by virtue of engagement of the camming surface 50 with one of the projections 53. When the cam is rotated farther to about 180° from the position of FIG. 8, the cam causes a follower 65 to close a normally open switch 66, with the result that coil 57b is energized. This pulls core 27 to the left as viewed in FIGS. 1 and 3, and the core moves angularly a small amount by virtue of engagement of the camming surface 51 with one of the projections 53. Thus, for each rotation of the shaft 26 and cam 62, there are a single energization of coil 57a and one of coil 57b, resulting in a reciprocation of the core 27 and two small angular movements thereof in the direction of the arrow 5, as shown in FIG. 3. Since the total angular movement of the core 27 due to one reciprocation thereof is equal to the angular spacing between adjacent projections 53 or 54, one rotation of the shaft 26 produces angular movement of the core 27 equal to 360° divided by the number of projections 53 or 54.

Since the core 27 is keyed to the threaded member 38 by the pin 41 in the core and the groove 40 in the threaded member receiving the pin 41, angular movement of the core due to its reciprocation also produces angular movement of the threaded member 38. Since the threaded member 38 has its portion 39 in threaded engagement with the interior of the fixed threaded member 36, member 38 moves longitudinally as it rotates. Since member 23 is held against rotation by engagement of its square portion 34 with the square opening in the fixed member 36 and has its threaded portion 37 in engagement with the threaded interior of member 38, member 23 moves longitudinally with respect to member 38 as the latter rotates. If the threads in portion 39 of member 38 and in portion 37 of member 23 are in the same direction, then tubular member 23 moves with respect to member 38 in the opposite direction to that in which member 38 moves with respect to the fixed member 36.

If portion 39 of member 38 has 44 threads per inch and the portion 37 of member 23 has 38 threads per inch, then member 38 moves rightward 1/44" with each rotation, and, at the same time, member 23 moves leftward 1/38" with respect to the fixed housing 36. If the reciprocating core 27 has 18 projections 53 and 18 projections 54, it has 1/18 of a rotation for each reciprocation of the core and each rotation of the shaft 26. Since the core 27 and member 38 rotate together, the member 23, upon each rotation of the shaft 26, moves 1/18 (1/38"–2/44") or .000199", with respect to the fixed member 36. The revolution counter 29 may be made to indicate a displacement of half that amount or .0001" by connection of the counter 29 to another shaft which is driven by shaft 26 through reduction gearing at half the speed of the shaft 26.

When the member 23 is moved sufficiently to the right to close the switch 24 by bringing the contact elements 32 and 33 thereof together, and then or thereafter the cam 62 reaches the position of FIG. 7 or one displaced 180° therefrom, the relay coil 59 is energized and opens the switch 58 to stop the motor 25. This can happen only in these two positions of the cam 62, because only in these positions is a circuit closed through the relay 59 by connection of the switches 60 and 61 to the same line (line 61a as shown in FIG. 7 or line 61b in the position of the cam 62 displaced 180° from the position of FIG. 7), because followers 69 and 70 controlling switches 60 and 61 engage portions of the cam 62 of minimum and maximum radial width. In these two positions of the cam 62 neither of solenoid coils 57a and 57b is energized, because neither of the switches 64 and 66 is closed, because both of the followers 63 and 65 are in engagement with portions of the cam 62 of intermediate radial width. Conversely, when either of the solenoid coils 57a and 57b is energized as happens in the cam position of FIG. 8 or one displaced 180° therefrom, the relay coil 59 cannot be energized to stop the motor 25, because in these cam positions the followers 69 and 70 engage portions of the cam 62 of intermediate radial width and prevent the switches 60 and 61 from being connected with the same one of lines 61a and 61b. The purpose in stopping the motor 25 only in a cam position in which neither of the coils 57a and 57b is energized, is to assure that a false reading will not be obtained by energization of the coil 57a or 57b when and if the apparatus is reconnected after being disconnected.

The core 27 is of a magnetic material such as iron or mild steel. The pawl 28 and the pin 42 are of hard steel. The associated parts such as rod 22, hollow members 23 and 38, housing 36, shell 44, sleeve 57, and ring 45 are of nonmagnetic material such as brass. The bearing 46 is of graphite.

The pawl 28 can be removed from the slot 52 in the shell 44 after removal of the screw 56 and be reversed end for end and returned to the slot 52 so that the camming surfaces 50 and 51 of the pawl are at the bottom, rather than at the top as viewed in FIG. 6, so that reciprocation of the core 27 will produce angular movement opposed to that of the arrow 55. At this time rod 22 and threaded member will be moved to the left as viewed in FIG. 1. Since in this movement the switch 24 will be closed, closing of switch 58 for operating the motor 25 will be produced by manual opening of a normally closed switch 71 in series with switch 24.

It is understood that the invention is not to be limited by the details given herein but that it may be modified within the scope of the appended claims.

The embodiments of the invention in which an exclusive property or privilege is claimed are defined as follows:

1. A measuring device comprising three threaded members, one of the members being fixed against axial movement and rotation, another of the members being keyed to the first so as to be prevented from rotating while being permitted axial movement, the third member having two threaded portions in separate engagement with the said one and other members so as to be capable of rotation and axial movement in response thereto, a reciprocating part keyed to the third threaded member and having two sets of peripherally spaced projections, one set of projections being at one end of the part, the other set being at the other end, the projections of one set being staggered with respect to the projections of the other set, means providing two camming surfaces, one engageable with the projections of one set individually on movement of the reciprocating part in one direction along the third threaded member to shift the latter and the reciprocating part angularly in a given direction of rotation, the other camming surface being engageable with the projections of the other set individually on movement of the reciprocating part in the opposite direction along the third threaded member to shift the latter and the reciprocating part angularly in the said given direction of rotation, means for reciprocating the reciprocating part, and means for counting the reciprocations of the reciprocating part.

2. A measuring device comprising three threaded members, one of the members being fixed against axial movement and rotation and having a noncircular opening and an internal threaded portion, another of the members having an external threaded portion and a noncircular exterior surface portion engaging the noncircular opening in the first threaded member so as to be prevented from rotating while being permitted axial movement, the third member having an external threaded portion and an internal threaded portion respectively engaging the internal threaded portion of the said one member and the external threaded portion of the said other member, a reciprocating part keyed to the exterior of the third threaded member and having two sets of external peripherally spaced projections, one set of projections being at one end of the part, the other set being at the other end, the projections of each set being spaced equally from one another and staggered with respect to the projections of the other set and being equal in number thereto, a pawl located exteriorly of the reciprocating part between the sets of projections and having two camming surfaces, one engageable with the projections of one set individually on movement of the reciprocating part in one direction along the third threaded member to shift the latter and the reciprocating part angularly in a given direction of rotation, an amount equal to 360° divided by twice the number of projections in each set, the other camming surface being engageable with the projections of the other set individually on movement of the reciprocating part in the opposite direction along the third threaded member to shift the latter and the reciprocating part angularly in the said given direction of rotation the aforesaid amount, a rotating shaft, means connecting the shaft and reciprocating part to make the part reciprocate in response to rotation of the shaft, and means for counting rotations of the shaft.

3. A measuring device comprising three threaded members, one of the members being fixed against axial movement and rotation, another of the members being keyed to the said one member so as to be prevented from rotating while being permitted axial movement, a third member thereof having two threaded portions in separate engagement with the said one and other members so as to be capable of rotation and axial movement in response thereto, a reciprocating part keyed to the third threaded member, a rotating shaft for producing a single reciprocation of the part in response to a single rotation of the shaft, means for causing the part and the third threaded member to move angularly only a small fraction of a rotation in response to a single reciprocation of the part, and means for counting rotations of the shaft.

4. A measuring device comprising three threaded members, one of the members being fixed against axial movement and rotation, another of the members being keyed to the first so as to be prevented from rotating while being permitted axial movement, the third member having two threaded portions in separate engagement with the said one and other members so as to be capable of rotation and axial movement in response thereto, a reciprocating part keyed to the third threaded member, means for causing the part and the third threaded member to move angularly only a small fraction of a rotation in response to a single reciprocation of the part, and means for counting reciprocations of the part.

5. A measuring device comprising three threaded members, one of the members being fixed against axial movement and rotation, another of the members engaging the said one member so as to be prevented from rotating while being permitted axial movement, the third member having threaded engagement with the interior of the said one member and with the exterior of the said other member, a solenoid core keyed to the third member and mounted on the said one member so as to be capable of reciprocating with respect to them and of moving angularly with the third member, a pair of spaced solenoid coils positioned adjacent the core for reciprocating the same, a rotatable shaft, a cam fixed thereon for causing the solenoid coils to be successively energized once for each coil for each rotation of the shaft, means for causing each reciprocation of the core to move the core and the third threaded part angularly only a small fraction of a rotation, and means for counting rotations of the shaft.

6. A measuring device comprising three threaded members, one of the members being fixed against axial movement and rotation, another of the members engaging the said one member so as to be prevented from rotating while being permitted axial movement, the third member having threaded engagement with the interior of the said one member and with the exterior of the said other member, a solenoid core keyed to the third member and mounted on the said one member so as to be capable of reciprocating with respect to them and of moving angularly with the third member, a pair of spaced solenoid coils positioned adjacent the core for reciprocating the same, a rotatable shaft, a cam fixed thereon for causing the solenoid coils to be successively energized once for each coil for each rotation of the shaft, means for causing each reciprocation of the core to move the core and the third threaded part angularly only a small fraction of a rotation, whereby each revolution of said shaft produces two small unidirectional increments of axial displacement of said second member, a fourth member axially movable in the same direction relative to said second member, an electrical switch, said second and fourth members each having an extension forming a contact of said switch, whereby said switch is closed only for a specific predetermined relative position of said second and fourth members and is open in all other relative positions, a motor for driving said shaft, circuit means responsive to the position of said switch for energizing and deenergizing said motor, and means for counting the rotations of said shaft.

7. A measuring device comprising three threaded members, one of the members being fixed against axial movement and rotation, another of the members engaging the said one member so as to be prevented from rotating while being permitted axial movement, the third member having threaded engagement with the interior of the said one member and with the exterior of the said other member, a solenoid core keyed to the third member and mounted on the said one member so as to be capable of reciprocating with respect to them and of moving angularly with the third member, a pair of spaced solenoid coils positioned adjacent the core for reciprocating the same, a rotatable shaft, a cam fixed thereon for causing the solenoid coils to be successively energized once for each coil for each rotation of the shaft, means for causing each reciprocation of the core to move the core and the third threaded part angularly only a small fraction of a rotation, whereby each revolution of said shaft produces two small unidirectional increments of axial displacement of said second member, a fourth member axially movable in the same direction relative to said second member, an electrical switch, said second and fourth members each having an extension forming a contact of said switch, whereby said switch is closed only for a specific predetermined relative position of said second and fourth members and is open in all other relative positions, a motor for driving said shaft, a second normally open relay operated switch in the power supply circuit for said motor, an auxiliary control circuit including, in series, said first switch, a relay winding associated with said second switch, and cam operated switching means, a second cam arrangement associated with said shaft for causing said cam operated switching means to close momentarily twice per revolution of said shaft and in phase quadrature with the closing of the solenoid coils, and means for counting the revolutions of said shaft.

8. A device for measuring the displacement of a surface in one direction comprising a supporting structure rigidly positioned adjacent said surface, first and second members carried by said structure for independent movement in said one direction, spring means for maintaining said first member in contact with said surface to cause said first member to move with said surface in said one direction, a first electrical switch, said members each having an extension forming a contact of said switch, whereby said switch is closed only for a specific predetermined relative position of said switch and is open for all other relative positions, a shaft, a motor for driving said shaft, means also operated by said motor for causing said second member to move in said one direction by a very small amount per revolution of said shaft, a second normally open relay operated switch in the power supply circuit for said motor, an auxiliary control circuit including, in series, said first switch, a relay winding associated with said second switch, and cam operated switching means, a cam arrangement associated with said shaft for causing said cam operated switching means to close momentarily each half revolution of said shaft, and means for counting the revolutions of said shaft.

References Cited by the Examiner
UNITED STATES PATENTS

| | | | |
|---|---|---|---|
| 2,338,271 | 1/44 | Ulanet | 74—424.8 |
| 2,554,171 | 5/51 | Brunot | 33—125 |
| 2,566,571 | 9/51 | Leland | 74—89 |
| 2,800,763 | 7/57 | Ensign | 58—28 |
| 2,875,631 | 3/59 | Syring | 74—424.8 |
| 2,887,889 | 5/59 | Parisoe | 74—99 |
| 2,888,832 | 6/59 | Winters | 74—424.8 |
| 2,966,064 | 12/60 | Courtney | 310—20 X |
| 3,092,740 | 6/63 | Leland | 310—23 |

FOREIGN PATENTS

| | | |
|---|---|---|
| 1,012,029 | 7/52 | France. |
| 8,798 | 4/06 | Great Britain. |

References Cited by the Applicant
UNITED STATES PATENTS

| | | |
|---|---|---|
| 2,338,271 | 1/44 | Ulanet. |
| 2,566,571 | 9/51 | Leland. |
| 2,875,631 | 3/59 | Syring. |
| 2,887,889 | 5/59 | Parisoe et al. |
| 2,888,832 | 6/59 | Winters. |

ISAAC LISANN, *Primary Examiner.*